United States Patent
Lee et al.

(10) Patent No.: US 12,060,496 B2
(45) Date of Patent: *Aug. 13, 2024

(54) OPTICAL LAMINATE AND FLEXIBLE DISPLAY DEVICE INCLUDING THE SAME

(71) Applicant: LG CHEM, LTD., Seoul (KR)

(72) Inventors: Eun Seon Lee, Daejeon (KR); Seung Joon Lim, Daejeon (KR); Ha Neul Kim, Daejeon (KR); Seungil Baek, Daejeon (KR); Se Jeong Kim, Daejeon (KR); Myoungseok Cho, Daejeon (KR); Yeongkyu Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 393 days.

This patent is subject to a terminal disclaimer.

(21) Appl. No.: 17/438,159

(22) PCT Filed: Aug. 14, 2020

(86) PCT No.: PCT/KR2020/095113
§ 371 (c)(1),
(2) Date: Sep. 10, 2021

(87) PCT Pub. No.: WO2021/060961
PCT Pub. Date: Apr. 1, 2021

(65) Prior Publication Data
US 2022/0145129 A1    May 12, 2022

(30) Foreign Application Priority Data

Sep. 25, 2019  (KR) .................. 10-2019-0118347
Aug. 3, 2020   (KR) .................. 10-2020-0096970

(51) Int. Cl.
*C09D 183/06*   (2006.01)
*C08G 77/18*    (2006.01)
*G06F 1/16*     (2006.01)
*H04M 1/02*     (2006.01)

(52) U.S. Cl.
CPC ........... *C09D 183/06* (2013.01); *C08G 77/18* (2013.01); *G06F 1/1652* (2013.01); *H04M 1/0268* (2013.01)

(58) Field of Classification Search
None
See application file for complete search history.

(56) References Cited

U.S. PATENT DOCUMENTS

| | | | |
|---|---|---|---|
| 8,139,181 B2 | 3/2012 | Yoshihara et al. | |
| 9,248,629 B2 | 2/2016 | Ogata et al. | |
| 9,403,991 B2 | 8/2016 | Kang et al. | |
| 9,567,479 B2 | 2/2017 | Kang et al. | |
| 9,701,862 B2 | 7/2017 | Kang et al. | |
| 9,778,398 B2 | 10/2017 | Kang et al. | |
| 9,783,698 B2 | 10/2017 | Kang et al. | |
| 9,811,192 B2 | 11/2017 | Woo et al. | |
| 9,884,977 B2 | 2/2018 | Kang et al. | |
| 9,896,597 B2 | 2/2018 | Kang et al. | |
| 9,902,868 B2 | 2/2018 | Kang et al. | |
| 9,909,026 B2 | 3/2018 | Kang et al. | |
| 9,926,461 B2 | 3/2018 | Kang et al. | |
| 10,000,655 B2 | 6/2018 | Kang et al. | |
| 10,087,340 B2 | 10/2018 | Kang et al. | |
| 10,294,387 B2 | 5/2019 | Kang et al. | |
| 11,709,294 B2 * | 7/2023 | Kim ................. | B32B 27/18 428/213 |
| 2012/0251778 A1 | 10/2012 | Shimano et al. | |
| 2013/0279155 A1 | 10/2013 | Kuroda et al. | |
| 2014/0178819 A1 | 6/2014 | Wu et al. | |
| 2015/0140279 A1 | 5/2015 | Kang et al. | |
| 2015/0166827 A1 | 6/2015 | Chen et al. | |
| 2015/0275043 A1 | 10/2015 | Kikuchi et al. | |
| 2016/0024348 A1 | 1/2016 | Kim et al. | |
| 2016/0154436 A1 | 6/2016 | Woo et al. | |
| 2016/0297933 A1 | 10/2016 | Kuwana et al. | |
| 2017/0145253 A1 | 5/2017 | Bae et al. | |
| 2017/0179424 A1 | 6/2017 | Lee et al. | |
| 2017/0283573 A1 | 10/2017 | Lee et al. | |
| 2018/0142128 A1 | 5/2018 | Kikuchi | |
| 2018/0334589 A1 | 11/2018 | Lee et al. | |
| 2018/0346759 A1 | 12/2018 | Kikuchi et al. | |
| 2018/0346760 A1 | 12/2018 | Kim et al. | |
| 2019/0292342 A1 | 9/2019 | Kikuchi | |
| 2020/0079910 A1 | 3/2020 | Shibamoto et al. | |
| 2021/0072427 A1 * | 3/2021 | Kim ................. | B32B 27/08 |
| 2021/0115210 A1 * | 4/2021 | Baek ................ | C08J 7/046 |

FOREIGN PATENT DOCUMENTS

| | | |
|---|---|---|
| CN | 101790695 A | 7/2010 |
| CN | 103885294 A | 6/2014 |
| CN | 105044969 A | 11/2015 |
| JP | 2009-084327 A | 4/2009 |
| JP | 2015-523242 A | 8/2015 |
| JP | 2015-524855 A | 8/2015 |
| JP | 2015-193747 A | 11/2015 |
| JP | 2015-212353 A | 11/2015 |

(Continued)

OTHER PUBLICATIONS

International Search Report issued for International Application No. PCT/KR2020/095113 on Dec. 3, 2020, 4 pages.

*Primary Examiner* — Sheeba Ahmed
(74) *Attorney, Agent, or Firm* — ROTHWELL, FIGG, ERNST & MANBECK, P.C.

(57) ABSTRACT

The present disclosure relates to an optical laminate for a flexible display device comprising: a support substrate layer; and a hard coating layer positioned on at least one surface of the support substrate layer and having a thickness of 10 μm to 250 μm, wherein the hard coating layer is a polysiloxane containing 70 mol % or more of a repeating unit including an epoxy group-containing functional group; and an elastomeric polymer including polycaprolactone polyol, and wherein the polysiloxane has a number average molecular weight of more than 3,000 and less than 10,000, and a polydispersity Index (PDI) of 1.0 or more and less than 5.0, and a flexible display device including the same.

14 Claims, 1 Drawing Sheet

(56) References Cited

FOREIGN PATENT DOCUMENTS

| | | |
|---|---|---|
| JP | 2018-083915 A | 5/2018 |
| KR | 10-2014-0014131 A | 2/2014 |
| KR | 10-1379491 B1 | 4/2014 |
| KR | 10-2015-0113876 A | 10/2015 |
| KR | 10-2016-0013402 A | 2/2016 |
| KR | 10-2016-0063073 A | 6/2016 |
| KR | 10-2016-0063093 A | 6/2016 |
| KR | 10-2016-0076040 A | 6/2016 |
| KR | 10-2017-0073948 A | 6/2017 |
| KR | 10-2017-0097376 A | 8/2017 |
| KR | 10-1798160 B1 | 12/2017 |
| KR | 10-1818487 B1 | 2/2018 |
| KR | 10-1828516 B1 | 2/2018 |
| KR | 10-1842813 B1 | 3/2018 |
| KR | 10-1845081 B1 | 4/2018 |
| KR | 10-2019-0048916 A | 5/2019 |
| KR | 10-2019-0085353 A | 7/2019 |
| KR | 10-2019-0094841 A | 8/2019 |
| TW | I520846 B | 2/2016 |
| TW | I589645 B | 7/2017 |
| WO | 2016203957 A1 | 12/2016 |
| WO | 2018212228 A1 | 11/2018 |
| WO | 2019212215 A1 | 11/2019 |
| WO | 2020091321 A1 | 5/2020 |

* cited by examiner

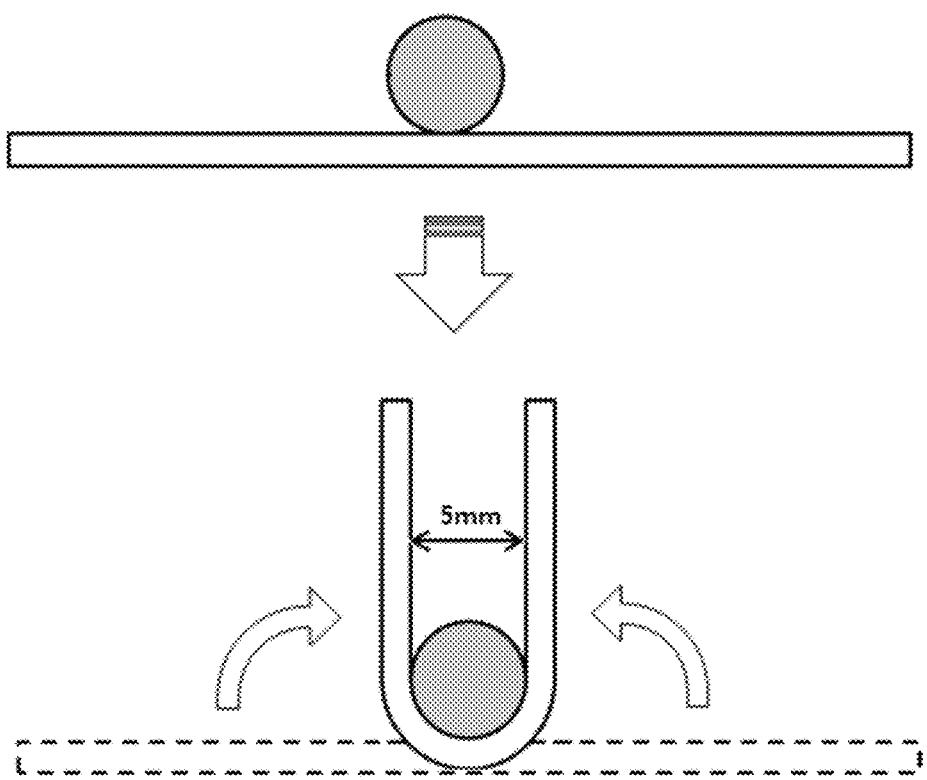

OPTICAL LAMINATE AND FLEXIBLE DISPLAY DEVICE INCLUDING THE SAME

CROSS-REFERENCE TO RELATED APPLICATION(S)

This application is a 35 U.S.C. 371 National Phase Entry Application from PCT/KR2020/095113, filed on Aug. 14, 2020 and designating the United States, claims the benefit of Korean Patent Application No. 10-2019-0118347 filed on Sep. 25, 2019 and Korean Patent Application No. 10-2020-0096970 filed on Aug. 3, 2020 with the Korean Intellectual Property Office, the disclosures of which are incorporated herein by reference in their entirety.

FIELD OF THE INVENTION

The present disclosure relates to an optical laminate for a flexible display device, and a flexible display device including the same.

BACKGROUND OF THE INVENTION

Recently, with the development of mobile devices such as smartphones and tablet PC, substrates for displays have recently been required to become thinner and slimmer. Display windows or front panels of such mobile devices are generally made of glass or reinforced glass both of which have excellent mechanical properties. However, the glass and reinforced glass themselves are heavy in weight, which cause an increase in the weight of the mobile devices, and also have a problem of being easily damaged by an external impact, and further are low in flexibility and thus, are limited in their application to flexible or foldable display devices.

Plastic resin is being studied as a substitute for glass. Since the plastic resin is lightweight, but is less prone to fragile and has flexibility and thus are suitable for the trend of pursuing the weight reduction and flexibility of mobile devices. Typically, polyethylene terephthalate (PET), polyether sulfone (PES), polyethylene naphthalate (PEN), polyacrylate (PAR), polycarbonate (PC), polyimide (PI), polyamideimide (PAI), etc. are used, but in the case of a substrate using these plastic resins, there exists a problem that hardness and scratch resistance are insufficient compared with a glass material. Thus, methods have been attempted in which a resin composition is coated onto a plastic resin substrate to form a hard coating layer, thereby supplementing high hardness and abrasion resistance.

As an example, a curable resin capable of mainly UV curing is used for hard coating on a foldable display substrate. However, since a conventional curable resin has high shrinkage during curing, resulting in severe curl, it should proceed with a thin coating and thus has a limitation in that impact resistance is low.

BRIEF SUMMARY OF THE INVENTION

The present disclosure provides an optical laminate for a flexible display device that has improved hardness and scratch resistance and thus can replace reinforced glass cover windows, and at the same time, has improved toughness and thus is excellent in impact resistance, and further, causes almost no damage to the film even by repetitive bending or folding operation, and thus, can be easily applied to bendable, flexible, rollable, or foldable mobile devices, display devices or the like.

The present disclosure also provides a flexible display device including the above-mentioned optical laminate.

In one aspect, there is provided an optical laminate for a flexible display device including: a support substrate layer; and a hard coating layer positioned on at least one surface of the support substrate layer and having a thickness of 10 μm to 250 μm, wherein the hard coating layer is a polysiloxane containing 70 mol % or more of a repeating unit including an epoxy group-containing functional group; and an elastomeric polymer including polycaprolactone polyol, and wherein the polysiloxane has a number average molecular weight of more than 3,000 and less than 10,000, and a polydispersity Index (PDI) of 1.0 or more and less than 5.0.

In another aspect, there is provided a flexible display device including the above-mentioned optical laminate for flexible display device.

DETAILED DESCRIPTION OF THE INVENTION

Hereinafter, an optical laminate and a flexible display device including the same according to specific embodiments of the present disclosure will be described in more detail.

As used herein, the "flexible" means a state having flexibility to such an extent that cracks of 3 mm or more in length do not occur when wound on a cylindrical mandrel with a diameter of 5 mm. Therefore, the optical laminate can be applied to a cover film of a bendable, flexible, rollable, or foldable display or the like.

As used herein, the "(meth)acrylate" is meant to include both acrylate and methacrylate.

As used herein, the "curing" is meant include both photo-curing or heat-curing.

As used herein, the weight average molecular weight (Mw) and the number average molecular weight (Mn) means a molecular weight (unit: Da (dalton)) converted in terms of polystyrene measured by a gel permeation chromatography (GPC). In the process of determining the weight average molecular weight in terms of polystyrene measured by the GPC method, a commonly known analyzing device, a detector such as a refractive index detector, and an analytical column can be used. Commonly applied conditions for temperature, solvent, and flow rate can be used. Specific examples of the measurement conditions may include a temperature of 30° C., chloroform solvent and a flow rate of 1 mL/min.

As used herein, the term "substituted or unsubstituted" means being unsubstituted or substituted with one or more substituents selected from the group consisting of deuterium; a halogen group; a nitryl group; a nitro group; a hydroxyl group; a carbonyl group; an ester group; an imide group; an amide group; a phosphine oxide group; an alkoxy group; an aryloxy group; an alkylthioxy group; an arylthioxy group; an alkylsulfoxy group; an arylsulfoxy group; a silyl group; a boron group; an alkyl group; a cycloalkyl group; an alkenyl group; an aryl group; an aralkyl group; an aralkenyl group; an alkylaryl group; an alkylamine group; an aralkylamine group; a heteroarylamine group; an arylamine group; an arylphosphine group; or a heterocyclic group containing at least one of N, O, and S atoms, or being unsubstituted or substituted with a substituent to which two or more substituents are linked among the substituents exemplified above. For example, "substituent group which two or more substituent groups are linked" may be a biphenyl group. That is, the biphenyl group may also be an aryl group, and may be interpreted as a substituent to which two phenyl groups are linked.

According to one embodiment of the present disclosure, there can be provided an optical laminate for a flexible display device including: a support substrate layer; and a hard coating layer positioned on at least one surface of the support substrate layer and having a thickness of 10 μm to 250 μm, wherein the hard coating layer is a polysiloxane containing 70 mol % or more of a repeating unit including an epoxy group-containing functional group; and an elastomeric polymer including polycaprolactone polyol, and wherein the polysiloxane has a number average molecular weight of more than 3,000 and less than 10,000, and a polydispersity Index (PDI) of 1.0 or more and less than 5.0.

The present inventors have proceeded with research related to an optical laminate applicable to a cover window of a flexible display device, and confirmed that when the hard coating layer of the optical laminate having a multi-layered structure of two or more layers includes a polysiloxane having a number average molecular weight of more than 3,000 and less than 10,000 and a polydispersity Index (PDI) of 1.0 or more and less than 5.0, and an elastomeric polymer containing polycaprolactone polyol, it can improve toughness while exhibiting high hardness, and thus exhibits excellent strength and impact resistance, and further confirmed that the film is hardly damaged even by repeated bending or folding, and thus, can be easily applied to a cover window such as bendable, flexible, rollable, or foldable mobile devices, or display devices, thereby completing the present disclosure.

Specifically, during preparation of the polysiloxane, the number average molecular weight, the polydispersity index (PDI), the weight average molecular weight, and the like may be adjusted by controlling the reaction rate using the reaction temperature, the amount of catalyst, and the type of solvent, and the polysiloxane may have a number average molecular weight (Mn) of more than 3,000 and less than 10,000, more than 3,000 and less than 8,000, more than 3,000 and less than 5,000, 3,100 to 4,700, or 3,200 to 4,500. When the number average molecular weight is 3,000 or less, the curing density is partially increased, and the hard coating layer, which is a cured product, may be too hard and thus prone to fragile, and when the number average molecular weight is 10,000 or more, the flowability of molecules is deteriorated and the curing efficiency is lowered, thereby reducing the hardness of the hard coating layer. In addition, since the uncured portion remains, the optical properties of the hard coating layer may be deteriorated.

Further, the polysiloxane may have a polydispersity index (PDI) of 1.0 or more and less than 5.0, 1.5 to 4.5, or 2.0 to 4.0. When the polysiloxane has a molecular weight distribution of 5.0 or more, it is difficult to control the molecular weight of the polymer during polymerization, and the flowability of the resin is poor, so that the compatibility with other additives may be deteriorated.

Further, the above-mentioned polysiloxane may have a weight average molecular weight of 3,000 to 250,000 g/mol, 4,000 to 230,000 g/mol, or 5,000 to 200,000 g/mol. By having the weight average molecular weight in the above range, more excellent hardness properties can be exhibited. When the weight average molecular weight is less than 3,000 g/mol, high hardness is not realized and rather ductility is likely to be exhibited, and when the weight average molecular weight is more than 250,000 g/mol, it exhibits high hardness, but there exists a possibility that film processability is deteriorated. Meanwhile, the weight average molecular weight and the number average molecular weight of the polysiloxane refer to the converted values with respect to a standard polystyrene as measured by gel permeation chromatography.

The optical laminate according to the one embodiment may have an impact absorption rate of −4% or less, −5% or less, −6% or less, or −7% or less which is calculated by the following Equation 1. When the impact absorption rate of the optical laminate exceeds −4%, the toughness, that is, the durableness, is lowered, and the strength and impact resistance of the optical laminate may be deteriorated.

Impact absorption rate=$(A_1-A_0/A_0)\times 100$    [Equation 1]

In Equation 1, $A_0$ is the impact force (N) measured by an impact force measurement sensor when a ball weighing 22 g is dropped from a height of 100 mm onto the impact force measurement sensor, and $A_1$ is the impact force (N) measured by an impact force measurement sensor when the optical laminate is positioned on the impact force measurement sensor and a ball weighing 22 g is dropped from a height of 100 mm with respect to the hard coat layer of the optical laminate.

Specifically, $A_0$ is a control group and means the impact force (N) measured by an impact force measurement sensor when the optical laminate is not positioned on the impact force measurement sensor and a ball weighing 22 g is dropped from a height of 100 mm on the impact force measurement sensor itself.

Meanwhile, $A_1$ means the impact force (N) measured by the impact force measuring sensor under the optical laminate when the optical laminate is positioned on the impact force measurement sensor, for example, the impact force measurement sensor and the support substrate layer of the optical laminate are positioned so as to be in contact with each other, and a ball weighing 22 g is dropped from a height of 100 mm with respect to the hard coating layer of the optical laminate.

However, when the above-mentioned optical laminate has a hard coating layer formed on both sides of the support substrate layer so that the hard coating layer is divided into the first and second hard coating layers, the optical laminate is positioned so that the first hard coating layer make a contact on the impact force measurement sensor, and a ball weighing 22 g is dropped from a height of 100 mm with respect to the second hard coating layer, thereby measuring the impact force (N) as in the method described above.

Further, the optical laminate may have a pencil hardness of 5H or more, 6H or more, or 7H or more under test conditions of load of 750 g on the surface of the hard coating layer.

Further, the optical laminate exhibits a bending durability to such an extent that a crack does not occur when placing the optical laminate at an interval of 5 mm in the middle of the optical laminate and repeating 100,000 times the processes of folding and spreading inward of the hard coating layer at an angle of 90° so as to face the hard coating layer at 25° C. at a speed of once per second.

FIG. 1 schematically shows a method for evaluating dynamic bending properties.

Referring to FIG. 1, the optical laminate is placed so as to be horizontal with the bottom, and set so that the interval between the portions folded at a middle portion of the optical laminate is 5 mm. Then, processes of folding and spreading both sides of the optical laminate at 90 degrees toward the bottom surface are repeated 100,000 times at 25° C. at a speed of once per second, thereby measuring the durability against bending. At this time, in order to maintain the distance between the folding portions constant, for example, the optical laminate is placed so as to be in contact with a rod having a diameter (R) of 5 mm, the remaining portion of the optical laminate film is fixed, and the processes of folding and spreading both sides of the optical laminate around the rod can be performed. Further, the folded portion is not particularly limited as long as it is the inside of the optical laminate, and for convenience of measurement, the central portion of the optical laminate may be folded so that the remaining portions of the optical laminate excluding the folded portion are symmetrical.

In the evaluation of such dynamic bending properties, the optical laminate does not generate cracks of 1 cm or more, or 3 mm or more even after bending 100,000 times, and does not substantially generate cracks. In particular, the support substrate layer of the optical laminate may be folded inward, or the hard coating layer may be folded inward, or the hard coating layer may be folded inward, and cracks do not occur even if any layer is folded inward. Therefore, even in actual application conditions such as repeatedly folding, rolling or warping, the possibility of occurrence of cracks is very low, and thus the flexible plastic film can be suitably applied for a cover plate of a flexible display.

The hard coating layer contained in the optical laminate according to the one embodiment includes polysiloxane containing 70 mol % or more of a repeating unit including an epoxy group-containing functional group.

The epoxy group-containing functional group is not particularly limited as long as it is a functional group containing an epoxy group, and for example, it may be selected from the group consisting of a functional group represented by the following Chemical Formula 1 and an alicyclic epoxy functional group.

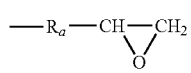
[Chemical Formula 1]

in the Chemical Formula 1, $R_a$ is a substituted or unsubstituted alkyl group having 1 to 6 carbon atoms, a substituted or unsubstituted alkenylene group having 2 to 20 carbon atoms, a substituted or unsubstituted alkynylene group having 2 to 20 carbon atoms, —$R_b$—CH=CH—COO—$R_c$—, —$R_d$—OCO—CH=CH—$R_e$—, —$R_f$O$R_g$—, —$R_h$COO$R_i$—, or —$R_j$O-CO$R_k$—, and $R_b$ to $R_k$ are each independently a single bond; or a substituted or unsubstituted alkylene group having 1 to 6 carbon atoms.

As the functional group represented by Chemical Formula 1 includes an epoxy group, it not only improves the physical properties of high hardness and scratch resistance, but also hardly has a risk of damage of the film even by repetitive bending or folding operation, and thus can be applied to bendable, flexible, rollable, or foldable mobile devices, display devices or the like.

For example, the epoxy group-containing functional group $R_a$ represented by Chemical Formula 1 may be methylene, ethylene, propylene, allylene, —$R_b$—CH=CH—COO—$R_c$—, —$R_d$—OCO—CH=CH—$R_e$—, —$R_f$O$R_g$—, —$R_h$COO$R_i$—, or —$R_j$OCO$R_k$—.

For example, in Chemical Formula 1, $R_b$ to $R_k$ may be a single bond, methylene, ethylene, propylene, or butylene.

For example, $R_a$ may be methylene, ethylene, or —$R_f$O$R_g$—, where $R_f$ and $R_g$ may be a direct bond, methylene or propylene.

For example, the functional group represented by Chemical Formula 1 may include, but not limited to, a glycidoxy group, a glycidoxyethyl group, a glycidoxypropyl group, or a glycidoxybutyl group.

Further, the alicyclic epoxy group may include, but not limited to, an epoxycyclohexyl or an epoxycyclopentyl.

Further, the polysiloxane may be represented by the following Chemical Formula 2.

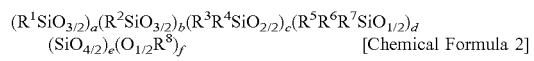
[Chemical Formula 2]

in the Chemical Formula 2, $R_1$ to $R_7$ are each independently hydrogen, an epoxy group-containing functional group, an amino group, a mercapto group, an ether group, an ester group, a carbonyl group, a carboxyl group, a (meth)acrylate, a sulfone group, a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted alkoxy group having 2 to 20 carbon atoms, a substituted or unsubstituted aryl group having 6 to 20 carbon atoms, a substituted or unsubstituted arylalkyl group having 7 to 20 carbon atoms, or a substituted or unsubstituted alkylaryl group having 7 to 20 carbon atoms, with the proviso that at least one of $R_1$ to $R_7$ may be the epoxy group-containing functional group.

In this case, at least one of $R_1$ to $R_7$ includes the epoxy group-containing functional group, wherein the repeating unit containing the epoxy group-containing functional group may be included in an amount of 70 mol % or more, 70 to 100 mol %, or 80 to 100 mol % with respect to the total molar content of all repeating units of the polysiloxane represented by Chemical Formula 2. When the content of the repeating unit including the epoxy group-containing functional group is less than 70 mol %, the curing density is decreased and thus, it is difficult for the hard coating film to exhibit sufficient surface hardness.

Further, in Chemical Formula 2, $R^8$ may be a hydrogen atom or an alkyl group having 1 to 20 carbon atoms.

It may be $0 < a \leq 1$, $0 \leq b \leq 1$, $0 \leq c \leq 1$, $0 \leq d \leq 1$, $0 \leq e \leq 1$, $0 \leq f \leq 1$.

The structural unit of $(R^1SiO_{3/2})$ and the structural unit of $(R^2SiO_{3/2})$ contained in the polysiloxane are T3 units, and the T3 unit means a structural unit in which three siloxane bonds are formed. The polysiloxane containing the T3 unit can increase the curing density and thus improve the surface hardness properties of the hard coating layer.

The molar ratio of the structural unit of $(R^1SiO_{3/2})$ and the structural unit of $(R^2SiO_{3/2})$, which are the T3 units, is a and b, respectively. The molar ratio of the T3 unit to total 100 mol % of the polysiloxane of Chemical Formula 2 may be 70 to 100 mol %, 80 to 99.9 mol %, 85 to 99 mol %, and 90 to 98 mol %. (In other words, it may be $0.7 \leq a+b \leq 1$, $0.8 \leq a+b \leq 0.999$, $0.85 \leq a+b \leq 0.99$, or $0.9 \leq a+b \leq 0.98$). Further, the ratio of a and b may be 1:0 to 1, 1:0.01 to 0.9, 1:0.05 to 0.7, or 1:1 to 0.5. When the ratio of a and b is 1:0, the molar ratio of a may be $0.7 \leq a \leq 1$, $0.8 \leq a \leq 0.999$, $0.85 \leq a \leq 0.99$, or $0.9 \leq a \leq 0.98$.

Further, the structural unit of $(R^3R^4SiO_{2/2})$ contained in the polysiloxane is a T2 unit, and the T2 unit means a structural unit in which two siloxane bonds are formed. The molar ratio of $(R^3R^4SiO_{2/2})$ is c, and the molar ratio of the T2 unit to the total molar content of the polysiloxane of Chemical Formula 2 may be $0 \leq c \leq 1$, $0.01 \leq c < 0.3$, or $0.05 \leq c \leq 0.2$.

Further, the structural unit of $(R^5R^6R^7SiO_{1/2})$ contained in the polysiloxane is a T1 unit, and the T1 unit means a structural unit in which one siloxane bond is formed. The molar ratio of $(R^5R^6R^7SiO_{1/2})$ is d, and the molar ratio of the T1 unit to the total molar content of the polysiloxane of Chemical Formula 2 may be 0≤d≤1, 0.01≤d<0.3, or 0.05≤d≤0.2.

The sum (c+d) of the structural unit of $(R^3R^4SiO_{2/2})$ and the structural unit of $(R^5R^6R^7iO_{1/2})$ may be 0≤c+d<0.3, 0.01≤c+d≤0.29, 0.05≤c+d≤0.25, or 0.07≤c≤0.23.

Specifically, $R_1$ is an epoxy group-containing functional group, and $R_2$ to $R_7$ may be hydrogen, an amino group, a mercapto group, an ether group, an ester group, a carbonyl group, a carboxyl group, a (meth)acrylate, a sulfone group, a methyl group, an ethyl group, a propyl group, a t-butyl group, a cyclohexyl group, a methoxy group, an ethoxy group, a propoxy group, a t-butoxy group, a phenyl group, a naphthalene group, and the like.

The polysiloxane may contain a structural unit of $(SiO_{4/2})$, which is a structural unit in which four siloxane bonds are formed. Further, the molar ratio of the structural unit of $(SiO_{4/2})$ is e, and e may be 0≤e≤1, 0.01≤e<0.3, or 0.05≤e≤0.2.

Further, the polysiloxane may contain a structural unit of $(O_{1/2}R^8)$ and polysiloxane containing the same can improve flexibility while maintaining excellent hardness properties. Further, the molar ratio of the structural unit of $(O_{1/2}R^8)$ is f, and f may be 0≤f≤1, 0.01≤f<0.3, or 0.05≤f≤0.2.

The $R_8$ may be a hydrogen atom or an alkyl group having 1 to 20 carbon atoms. More specifically, it may be a hydrogen atom, an ethyl group, a propyl group, an isopropyl group, a butyl group, an isobutyl group, and the like.

Polysiloxanes including the above-mentioned structural units can be prepared by hydrolysis and condensation reaction of a type of alkoxysilane alone, or between one type of alkoxysilane and a heterogeneous alkoxysilane. At this time, the molar ratio of each structural unit can be controlled through the adjustment of the content ratio of the alkoxysilane. Meanwhile, the molar ratio of each structural unit constituting the polysiloxane can be determined by $^1$H-NMR or $^{29}$Si-NMR spectrum measurement.

Meanwhile, the polysiloxane may have an epoxy group-containing functional group equivalent weight of 2.5 to 6.3 mmol/g or 3.0 to 6 mmol/g. When the equivalent weight of the epoxy group-containing functional group is too small, the strength of the hard coating layer, which is a cured product, decreases, and when the equivalent weight of the epoxy group-containing functional group is too large, it is difficult to adjust the reaction rate, and there is a problem that partial high curing is made which is prone to fragile. The equivalent weight of such a functional group is a value obtained by dividing the molecular weight of the polysiloxane by the number of functional groups, and can be analyzed by H-NMR or chemical titration.

The hard coating layer contained in the optical laminate according to the one embodiment includes an elastic polymer including polycaprolactone polyol. The elastomeric polymer imparts stress resistance properties through the toughness of the hard coating layer, minimizes shrinkage during curing, improves warpage characteristics, and also enhance impact resistance and hardness characteristics, and at the same time, can improve flexibility such as bending properties.

Specifically, the elastomeric polymer contained in the hard coating layer can be contained in an amount of 5 to 80 parts by weight, 10 to 80 parts by weight, 20 to 70 parts by weight, or 25 to 60 parts by weight based on 100 parts by weight of the polysiloxane containing 70 mol % or more of the repeating unit including the epoxy group-containing functional group. When the content of the elastomeric polymer is too high, there is a concern that the film density is greatly reduced, and when the content of the elastomeric polymer is too small, the improvement effect due to the inclusion of the elastomeric polymer is not sufficiently obtained, and there is a possibility that warpage properties and bendability are reduced.

The elastomeric polymer includes polycaprolactone polyol, which can be crosslinked and polymerized by ultraviolet irradiation as compared with conventional elastomeric polymers such as rubber, and high hardness and flexibility can be achieved without deterioration of the other physical properties. In particular, in the polycaprolactone polyol, an ester group and an ether group are contained and repeated in the repeating unit at the same time, and thereby, it may exhibit a more excellent effect in terms of flexibility, hardness and impact resistance when used in combination with the siloxane.

The polycaprolactone polyol may have a number average molecular weight (Mn) of 300 to 10,000 Da, or 1,000 to 5,000 Da. When the above number average molecular weight condition is satisfied, the compatibility with other components in the hard coating layer may be increased, and the surface hardness of the cured product may be improved, thereby further improving heat resistance and abrasion resistance of the cured product.

Further, the elastomeric polymer may, in addition to the polycaprolactone polyol, include one or more selected from the group consisting of, for example, C1 to C20 alkanediol, polyolefin polyol, polyester polyol, polyether polyol and polycarbonate polyol.

The hard coating layer contained in the optical laminate according to the one embodiment may further include a reactive monomer including at least one functional group capable of crosslinking with the polysiloxane. The reactive monomer includes at least one functional group capable of crosslinking with the polysiloxane described above, thereby, lowering the viscosity of the polysiloxane, facilitating processability, and improving coating adhesion.

The reactive monomer is a functional group capable of crosslinking with the polysiloxane, an example thereof may include at least one selected from the group consisting of an alicyclic epoxy group, a glycidyl group and an oxetanyl group.

Further, the reactive monomer containing at least one functional group capable of crosslinking with the polysiloxane may include at least one selected from the group consisting of, for example, bisphenol A diglycidyl ether, 4-vinylcyclohexene dioxide, cyclohexene vinyl monooxide, (3,4-epoxycyclohexyl) methyl 3,4-epoxycyclohexylcarboxylate, 3,4-epoxycyclohexylmethyl methacrylate, 3,4-epoxycyclohexanecarboxylate, 2-(3,4-epoxycyclohexyl)-1,3-dioxolane, bis(3,4-epoxycyclohexylmethyl)adipate, p-butyl phenol glycidyl ether, butyl glycidyl ether, cresyl glycidyl ether, allyl glycidyl ether, phenyl glycidyl ether, diglycidyl ether, butanediol diglycidyl ether, limonene dioxide, vinylcyclohexene dioxide, diethylene glycol diglycidyl ether, 3-methyloxetane, 2-methyloxetane, 3-oxetanol, 2-methyleneoxetane, 3-methyl-3-hydroxymethyloxetane, 3-ethyl-3-hydroxymethyloxetane, 3,3-oxetanedimethane thiol, 2-ethylhexyl oxetane, 4-(3-methyloxetane-3-yl)benzonitrile, N-(2,2-dimethylpropyl)-3-methyl-3-oxetanemethanamine, N-(1,2-dimethylbutyl)-3-methyl-3-oxetanemethanamine, xylylene bisoxetane, 3-ethyl-3[{(3-ethyloxetane-3-yl)

methoxy}methyl]oxetane, (3-ethyloxetane-3-yl) methyl (meth)acrylate, and 4-[(3-ethyloxetane-3-yl)methoxy]butan-1-ol.

The weight ratio of the polysiloxane and the reactive monomer contained in the hard coating layer may be 99:1 to 80:20, 97:3 to 85:5, or 95:5 to 90:10. When the polysiloxane is contained in an excessively large amount compared to the reactive monomer, the improvement effect due to the inclusion of the reactive monomer may be insignificant, and when the polysiloxane is contained in an excessively small amount compared to the elastomeric polymer, the viscosity of the polysiloxane becomes excessively low due to the excessive amount of the reactive monomer, and thus processability may be rather deteriorated.

In addition, the hard coating layer may further include an acrylate-based compound in order to improve surface hardness.

The acrylate-based compound may include polyfunctional acrylate-based compounds, such as 2-ethylhexyl acrylate, octadecyl acrylate, isodecyl acrylate, 2-phenoxyethyl acrylate, lauryl acrylate, stearyl acrylate, behenyl acrylate, tridecyl methacrylate, nonylphenol ethoxylate monoacrylate, β-carboxyethyl acrylate, isobornyl acrylate, tetrahydrofurfuryl acrylate, tetrahydrofurfuryl methacrylate, 4-butylcyclohexyl acrylate, dicyclopentenyl acrylate, dicyclopentenyl oxyethyl acrylate, ethoxyethoxyethyl acrylate, ethoxylated monoacrylate, 1,6-hexanediol diacrylate, triphenyl glycol diacrylate, butanediol diacrylate, 1,3-butylene glycol dimethacrylate, 1,6-hexanediol dimethacrylate, neopentyl glycol diacrylate, ethylene glycol dimethacrylate, diethylene glycol diacrylate, diethylene glycol dimethacrylate, tetraethylene glycol diacrylate, tetraethylene glycol dimethacrylate, triethylene glycol diacrylate, triethylene glycol dimethacrylate, polyethylene glycol diacrylate, polyethylene glycol dimethacrylate, dipropylene glycol diacrylate, ethoxylated neopentylglycol diacrylate, trimethylolpropane triacrylate, trimethylolpropane trimethacrylate, pentaerythritol triacrylate, pentaerythritol trimethacrylate, pentaerythritol tetramethacrylate, pentaerythritol tetraacrylate, ethoxylated triacrylate, tris(2-hydroxyethyl)isocyanurate triacrylate, di pentaerythritol pentaacrylate, ditrimethylolpropane tetraacrylate, alkoxylated tetraacrylate, or the like, preferably, pentaerythritol triacrylate, pentaerythritol trimethacrylate, pentaerythritol tetramethacrylate, pentaerythritol tetraacrylate or the like, and any one thereof or a mixture of two or more thereof may be used.

In addition, the acrylate-based compound may include acrylate-based oligomers such as polyester acrylate, polyether acrylate, urethane acrylate or epoxy acrylate, and any one thereof or a mixture of two or more thereof may be used. Among the above acrylate-based compounds, urethane acrylate oligomers may be more preferably used in consideration of the remarkable effect of improving the surface hardness when used in combination with the above-mentioned polysiloxane.

The urethane acrylate-based oligomer may have 6 to 9 functional groups. When the number of functional groups are less than 6, the effect of improving the hardness may be insignificant, and when it is more than 9, the hardness is excellent, but the viscosity can be increase. Further, as the urethane (meth)acrylate oligomer, those used in the art can be used without limitation. Preferably, those prepared by reacting a compound having at least one isocyanate group in the molecule with a (meth)acrylate compound having at least one hydroxyl group in the molecule may be used.

When the acrylate-based compound is further included, it may be included in an amount of 0.1 to 20 parts by weight, or 1 to 15 parts by weight, or 5 to 10 parts by weight based on 100 parts by weight of the polysiloxane. When the content of the acrylate-based compound is less than 0.1 parts by weight, the improvement effect due to the inclusion of the acrylate-based compound is insignificant, and when the content of the acrylate-based compound is more than 20 parts by weight, the effect of improving the surface hardness may be rather inhibited due to the excess acrylate-based compound.

Together with the components described above, the hard coating layer may include independently one or more additives commonly used in the art, such as antioxidants, surfactants, yellowing inhibitors, inorganic fillers, lubricants, coating aids, and antifouling agents.

In addition, the hard coating layer may have a thickness of 10 to 250 μm, 50 to 250 μm, or 60 to 200 μm. As the thickness of the hard coating layer becomes thicker, the strength is increased. However, when the thickness is too thick, it is likely to break when folding, and when the thickness is too thin, the strength may be poor even if the folding property is secured. In addition, when the hard coating layer is formed on both sides of the support substrate layer, the first hard coating layer and the second hard coating layer may have the same or different thickness.

Meanwhile, the support substrate layer may include a transparent plastic resin. Specific examples of the plastic resins include polyester-based resin, cellulose-based resin, polycarbonate-based resin, acrylic-based resin, styrene-based resin, polyolefin-based resin, polyimide-based resin, polyether sulfone-based resin, sulfone-based resin, and the like, and any one thereof or a mixture of two or more thereof may be used.

More specifically, the support substrate layer may include at least one selected among polyethyleneterephtalate (PET), cyclic olefin copolymer (COC), polyacrylate (PAC), polycarbonate (PC), polyethylene (PE), polymethylmethacrylate (PMMA), polyetheretherketon (PEEK), polyethylenenaphthalate (PEN), polyetherimide (PEI), polyimide (PI), polyamideimide (PAI) and triacetylcellulose (TAC).

Meanwhile, the above support substrate may be a single layer or a multilayer structure including two or more layers composed of the same or different materials. In one example, the support substrate layer may be a multilayer structure of polyethylene terephthalate (PET), a multi-layered structure formed by coextrusion of polymethyl methacrylate (PMMA)/polycarbonate (PC), or a monolayer structure including a copolymer of polymethyl methacrylate (PMMA) and polycarbonate (PC).

Further, the support substrate layer may be subjected to plasma surface treatment, if necessary, and the method is not particularly limited and may be performed according to a conventional method.

Further, if the thickness of the support substrate layer is excessively thick or thin, it is problematic in terms of surface hardness, a decrease in impact resistance or folding properties, and therefore, it may be desirable to appropriately set the range. For example, the support substrate layer may have a thickness of 30 to 500 μm, more specifically 50 to 100 μm.

In the optical laminate having the above-mentioned structure and configuration, a resin composition for forming a hard coating layer may be coated onto one surface of the support substrate layer and then cured to form a hard coating layer. Also, a resin composition for forming a hard coating layer may be coated onto one surface of the support substrate layer and then a resin composition for forming a hard coating layer similar or identical to the resin composition for forming a hard coating layer may be coated onto another surface of the support substrate layer and cured to form a hard coating layer.

In the method for manufacturing the optical laminate, the constitutions of the polysiloxane, the elastomeric polymer, the reactive monomer, and the like contained in the resin composition for forming the hard coating layer and the weight ratio thereof are the same as described above.

In addition, the resin composition for forming the hard coating layer may further include an initiator. The initiator may be a photopolymerization or thermal polymerization initiator well known in the art, and the type thereof is not particularly limited. For example, the photopolymerization initiator may include at least one selected from the group consisting of an aryl sulfonium hexafluoroantimonate salt, an aryl sulfonium hexafluorophosphate salt, a diphenyldiodonium hexafluorophosphate salt, a diphenyldiodonium hexaantimonate salt, a ditolyliodonium hexafluorophosphate salt and a 9-(4-hydroxyethoxyphenyl)thianthrenium hexafluorophosphate salt, but may not be limited thereto. The thermal polymerization initiator may include one or more selected from the group consisting of a 3-methyl-2-butenyltetramethylenesulfonium hexafluoroantimonate salt, an ytterbium trifluoromethenesulfonate salt, a samarium trifluoromethenesulfonate salt, an erbium trifluoromethenesulfonate salt, a dysprosium trifluoromethenesulfonate salt, a lanthanum trifluoromethenesulfonate salt, a tetrabutylphosphonium methenesulfonate salt, an ethyltriphenylphosphonium bromide salt, benzyldimethylamine, dimethylaminomethylphenol, triethanolamine, N-n-butylimidazole and 2-ethyl-4-methylimidazole, but may not be limited thereto.

The initiator may contain 0.1 to 10 parts by weight, or 0.5 to 5 parts by weight, or 1 to 4 parts by weight based on 100 parts by weight of the above composition. When the content of the initiator is less than 0.1 part by weight, only surface curing may occur or epoxy curing may not occur sufficiently, which results a reduction in hardness. Also, when the content of the initiator exceeds 10 parts by weight, it may cause cracking and peeling of the hard coating layer due to a fast curing rate.

The resin composition for forming the hard coating layer can be used in a solvent-free manner when there is no problem in the process. However, in order to adjust the viscosity and flowability of the composition during coating, and to increase the coatability of the composition, it may optionally further include an organic solvent.

When the organic solvent is further included, as the organic solvent, alcohol based solvents such as methanol, ethanol, isopropyl alcohol, or butanol; alkoxy alcohol based solvents such as 2-methoxyethanol, 2-ethoxyethanol, or 1-methoxy-2-propanol; ketone based solvents such as acetone, methyl ethyl ketone, methyl isobutyl ketone, methyl propyl ketone, or cyclohexanone; ether based solvents such as propylene glycol monopropyl ether, propylene glycol monomethyl ether, ethylene glycol monoethyl ether, ethylene glycol monopropyl ether, ethylene glycol monobutyl ether, diethylene glycol monomethyl ether, diethyl glycol monoethyl ether, diethyl glycol monopropyl ether, diethyl glycol monobutyl ether, or diethylene glycol-2-ethylhexyl ether; acetate-based solvents such as propylene glycol monomethyl ether acetate, ethylene glycol monoethyl ether acetate, diethylene glycol monobutyl ether acetate, diethylene glycol monoethyl ether acetate; or aromatic solvents such as benzene, toluene or xylene, etc. can be used alone or in combination.

Further, the resin composition for forming the hard coating layer may further include antioxidants, surfactants, yellowing inhibitors, inorganic fillers, lubricants, coating aids, and antifouling agents, in addition to the above-described components. Further, since the content can be variously adjusted within a range that does not deteriorate the physical properties, it is not particularly limited, but for example, it may be contained in an amount of 0.1 to 10 parts by weight with respect to total 100 parts by weight of the composition.

As an example, the antioxidant is used for suppressing an oxidation reaction caused by the polymerization initiator, and may include one or more mixtures selected from the group consisting of phenolic-based antioxidant, phosphate-based antioxidant, amine-based antioxidant, thioester-based antioxidant, and the like, but may not be limited thereto. The surfactant may be mono- or bifunctional fluorine-based acrylate, fluorine-based surfactant or silicon-based surfactant. At this time, the surfactant may be included in a form of being dispersed or crosslinked in the crosslinked copolymer. In addition, the yellowing inhibitors may include a benzophenone-based compound or a benzotriazole-based compound.

The coating step of the resin composition for forming the hard coating layer can be carried out by a known method such as a die coater, an air knife, a reverse roll, spray, a blade, casting, gravure, spin coating, or bar coating.

Further, a step for curing may be performed after each resin composition is coated, and the curing may be performed by heat-curing or photo-curing according to a conventional method. Heat treatment or light irradiation conditions for the heat-curing and photo-curing may be appropriately controlled through adjustment of the wavelength region and the amount of light, or the heat treatment temperature according to the type of the initiator.

According to another embodiment of the present disclosure, there can be provided a flexible display device including the optical laminate for flexible display device.

The flexible display device may include curved, bendable, flexible, rollable, or foldable mobile communication terminal, smartphone, tablet PC touch panel, and wearable devices and various displays. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

Meanwhile, the flexible display device may be, for example, a liquid crystal display (LCD) device, a light emitting diode (LED) display device, an organic light emitting diode (OLED) display device, a microelectromechanical system (MEMS) display device or a rollable display or foldable display.

For example, in the organic light emitting diode (OLED) display device, a cover window of the flexible organic light emitting diode display device may be positioned on an outer portion in a direction in which light or an image is emitted, and a cathode providing electrons, an electron transport layer, an emission layer, a hole transport layer, and an anode providing holes may be sequentially formed. Further, the organic light emitting diode (OLED) display may also further include a hole injection layer (HIL) and an electron injection layer (EIL).

In order to allow the organic light emitting diode (OLED) display to serve and act as a flexible display, a material having predetermined elasticity may be used in negative and positive electrodes and each of the constituent components.

Another example of the flexible display device may be a rollable display or foldable display.

Meanwhile, the rollable display device may have various structures according to an application field, a specific shape, and the like. For example, the rollable display device may have a structure including a cover window, a touch panel, a polarizing plate, a barrier film, a light emitting element (OLED element, or the like), a transparent substrate, or the like.

Another example of the flexible display device may be a liquid crystal display device including a pair of polarizing plates facing each other; a thin film transistor, a color filter, and a liquid crystal cell sequentially laminated between the pair of polarizing plates; and a backlight unit.

In the display device, the optical laminated film can be provided on the outermost surface of a display panel facing an observer or on the outermost surface thereof facing a backlight.

Advantageous Effects

According to the present disclosure, an optical laminate for a flexible display device having improved toughness and excellent impact resistance while having high hardness and excellent scratch resistance, and a flexible display device including the same can be provided.

In addition, the optical laminate is excellent in physical properties such as flexibility, high hardness and scratch resistance while exhibiting improved bending properties, in particular, hardly has a risk of damage of the film even by repetitive bending or folding operation, and thus can be usefully applied to bendable, flexible, rollable or foldable mobile devices, display devices, front face and display unit of various instrument panels, and the like.

BRIEF DESCRIPTION OF THE DRAWINGS

FIG. 1 is a view schematically showing a method for evaluating dynamic bending properties.

Hereinafter, the present disclosure will be described in more detail by way of the following examples. However, these examples are provided for illustrative purposes only and are not intended to limit the scope of the present disclosure.

Preparation Example

Preparation Example 1: Preparation of Polysiloxane A

Silane monomer 3-glycidoxypropyltrimethoxysilane (GPTMS, KBM-403™, Shin-Etsu), water and toluene were placed in a 1000 mL 3-neck flask, mixed and stirred. (GPTMS:water:toluene=1 mol:3 mol:0.5 mol).

Next, a basic catalyst (trimethylammonium hydroxide; TMAH) was added to the resulting mixed solution in an amount of 1 part by weight based on 100 parts by weight of the silane monomer, and reacted at 100° C. for 2 hours to prepare polysiloxane A of the following composition containing 100 mol % of glycidoxypropyl modified silicone (hereinafter referred to as GP) (number average molecular weight: 3,100 g/mol, polydispersity index (PDI): 1.8, glycidoxypropyl group equivalent weight: 6.0 mmol/g).

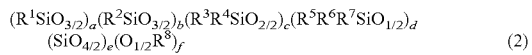   (2)

(in Chemical Formula 2, $R_1$ is a glycidoxypropyl group (in Chemical Formula 1, $R_a$ is —$R_b OR_c$—, $R_b$ is a propylene group, and $R_c$ is a methylene group), $R^8$ is a hydrogen atom or a methyl group, a=0.93, b, c, d, e=0, f=0.07.)

Preparation Example 2: Preparation of Polysiloxane B

Silane monomer 2-(3,4-epoxycyclohexyl)ethyltrimethoxysilane (ECTMS, KBM-303™, Shin-Etsu), water and toluene were placed in a 1000 mL 3-neck flask, mixed and stirred (ECTMS:water:toluene=1 mol:3 mol:0.5 mol).

Next, a basic catalyst (trimethylammonium hydroxide; TMAH) was added to the resulting mixed solution in an amount of 1 part by weight based on 100 parts by weight of the silane monomer, and reacted at 100° C. for 2 hours to prepare polysiloxane B having the following composition containing 2-(3,4-epoxycyclohexyl) Polysiloxane B having the following composition was prepared containing 100 mol % of 2-(3,4-epoxycyclohexyl) ethyl modified silicone (hereinafter referred to as EC) (number average molecular weight: 3,300 g/mol, polydispersity index (PDI): 1.8, epoxycyclohexyl group equivalent weight: 5.6 mmol/g).

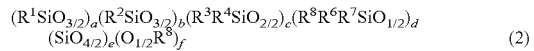   (2)

(in the Chemical Formula 2, $R^1$ is a 2-(3,4-epoxycyclohexyl)ethyl group, $R^8$ is a hydrogen atom or a methyl group, a=0.95, b, c, d, e=0, f=0.05.)

Preparation Example 3: Preparation of Polysiloxane C

Silane monomer 3-glycidoxypropyltrimethoxysilane (GPTMS, KBM-403™, Shin-Etsu), phenyltrimethoxysilane (PTMS, Shin-Etsu), water and toluene were placed in a 1000 mL 3-neck flask, mixed and stirred (GPTMS:PTMS:water:toluene=0.7 mol:0.3 mol:3 mol:0.5 mol).

Next, a basic catalyst (ammonia) was added to the resulting mixed solution in an amount of 1 part by weight with respect to 100 parts by weight of the silane monomer, and reacted at 100° C. for 2 hours to prepare polysiloxane C having the following composition (number average molecular weight: 3,400 g/mol, polydispersity index (PDI): 1.9, glycidoxypropyl group equivalent: 4.5 mmol/g).

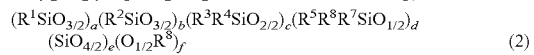   (2)

(in Chemical Formula 2, $R^1$ is a glycidoxypropyl group (in Chemical Formula 1, $R_a$ is —$R_b OR_c$—, $R_b$ is a propylene group, and $R_c$ is a methylene group), $R^2$ is a phenyl group, $R^8$ is a hydrogen atom or a methyl group, a=0.7, b=0.3, c, d, e=0, f<0.01.)

Preparation Example 4: Preparation of Polysiloxane D

Polysiloxane D having the following composition containing 100 mol % of 2-(3,4-epoxycyclohexyl)ethyl modified silicone (number average molecular weight: 1,400 g/mol, polydispersity index (PDI): 1.4, 2-(3,4-epoxycyclohexyl) ethyl group equivalent weight: 5.6 mmol/g) was prepared in the same manner as in Preparation Example 2, except that the toluene ratio was used at 5 mol.

Preparation Example 5: Preparation of Polysiloxane E

Polysiloxane E having the following composition (number average molecular weight: 3,300 g/mol, polydispersity index (PDI): 1.7, glycidoxypropyl group equivalent weight: 3.4 mmol/g) was prepared in the same manner as in Preparation Example 3, except that the silane monomer 3-glycidoxypropyltrimethoxysilane (GPTMS, KBM-403™, Shin-Etsu), phenyltrimethoxysilane (PTMS, Shin-Etsu), water and toluene were added, mixed and stirred (GPTMS:PTMS: water:toluene=0.5 mol:0.5 mol:3 mol:0.5 mol).

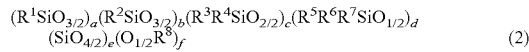

(In Chemical Formula 2, $R^1$ is a glycidoxypropyl group (in Chemical Formula 1, $R_a$ is —$R_bOR_c$—, $R_b$ is a propylene group, and $R_c$ is a methylene group), $R_2$ is a phenyl group, $R_8$ is a hydrogen atom or a methyl group, a=0.5, b=0.45, c, d, e=0, f<0.01.)

Examples and Comparative Examples

Example 1

75 g of polysiloxane A prepared in Preparation Example 1, 22 g of polycaprolactone triol (number average molecular weight: 300 Da, manufacturer: Merck) as an elastomeric polymer, 3 g of Irgacrue 250 as a photoinitiator, and 10 g of methyl ethyl ketone as a solvent were mixed to prepare a resin composition for forming a hard coating layer.

The resin composition for forming the hard coating layer was coated onto one surface of a polyethylene terephthalate (PET) film having a size of 15 cm×20 cm and a thickness of 50 μm, and irradiated with ultraviolet rays using a lamp (irradiation amount: 1,000 mJ/cm²) and photocured to form the hard coating layer with a thickness of 80 μm, thereby producing an optical laminate.

Example 2

The optical laminate was manufactured in the same manner as in Example 1, except that polysiloxane B prepared in Preparation Example 2 was used instead of polysiloxane A prepared in Preparation Example 1.

Example 3

The optical laminate was manufactured in the same manner as in Example 1, except that polysiloxane C prepared in Preparation Example 3 was used instead of polysiloxane A prepared in Preparation Example 1.

Comparative Example 1

The optical laminate was manufactured in the same manner as in Example 1, except that polysiloxane D prepared in Preparation Example 4 was used instead of polysiloxane A prepared in Preparation Example 1.

Comparative Example 2

The optical laminate was manufactured in the same manner as in Example 1, except that Gp-D4 was used instead of polysiloxane A prepared in Preparation Example 1, and polycaprolactone triol was not used.

At this time, Gp-D4 is "2,4,6,8-tetramethyl-2,4,6,8-tetrakis (propyl glycidyl ether) cyclotetrasiloxane", and the number average molecular weight is 664 g/mol.

Comparative Example 3

The optical laminate was manufactured in the same manner as in Example 1, except that polysiloxane E prepared in Preparation Example 5 was used instead of polysiloxane A prepared in Preparation Example 1.

Comparative Example 4

The optical laminate was manufactured in the same manner as in Example 1, except that polysiloxane B prepared in Preparation Example 2 was used instead of polysiloxane A prepared in Preparation Example 1, and polycaprolactone triol which is an elastomeric polymer was not used.

Experimental Example

The physical properties of the optical laminates prepared in Examples and Comparative Examples were measured by the following method, and the results are shown in Table 1 below.

1. Measurement of Surface Pencil Hardness

A pencil was set on the surface of the hard coating layer of the optical laminate at an angle of 45° under a load of 750 g and the surface was scratched a total of 5 times for each pencil hardness of 20 mm. Whether the test specimen was scratched or not was determined with the naked eye, and the maximum pencil hardness that did not cause surface damage more than 3 times was measured.

2. Measurement of Impact Absorption Rate

When a ball weighing 22 g was dropped from a height of 100 mm onto the optical laminate, the impact absorption rate of the optical laminate was measured.

Specifically, in the control group, the impact force (N) was measured with an impact force measurement sensor, when the optical laminate was not positioned on the impact force measurement sensor and a ball weighing 22 g was dropped from a height of 100 mm onto the impact force measurement sensor itself, which was defined as "$A_0$". Next, the impact force (N) was measured by the impact force measuring sensor, when the optical laminate was positioned on the impact force measurement sensor, more specifically, the impact force measurement sensor and the support substrate layer of the optical laminate were position so as to be in contact with each other, and a ball weighing 22 g was dropped from a height of 100 mm with respect to the hard coating layer of the optical laminate, which was defined as "$A_1$".

Thereafter, "$A_0$" and "$A_1$" were substituted into Equation 1 below to calculate the shock absorption rate.

$$\text{Impact absorption rate} = (A_1 - A_0/A_0) \times 100 \quad \text{[Equation 1]}$$

3. Dynamic Bending Properties

FIG. 1 is a view schematically showing a method for evaluating dynamic bending properties of the optical laminate according to an embodiment of the present disclosure.

The optical laminate was cut, but laser cutting was performed into a size of 80×140 mm so as to minimize fine cracks at the edge portions. The laser cut film was placed on the measuring equipment the hard coating layer was set inward, and set so that the interval between the folded portions was 5 mm. Then, processes of folding and spreading both sides of the films at 90 degrees toward the bottom surface at room temperature were repeated 100,000 times by continuous operations (the speed at which the film was folded was once every 1 second at 25° C.), and the dynamic bending properties were evaluated according to the following criteria.

Excellent: No cracks occurred
Defective: Cracks occurred

4. Elongation at Break

The optical laminate was cut into a width of 10 mm and a length of 150 mm, and the elongation at break in the longitudinal direction was measured with UTM (Universal Testing Machine, Instron's sample) and the following conditions.

Sample measurement length 100 mm,
Measurement speed 10 mm/min

TABLE 1

|  | Example 1 | Example 2 | Example 3 | Comparative Example 1 | Comparative Example 2 | Comparative Example 3 | Comparative Example 4 |
|---|---|---|---|---|---|---|---|
| Surface pencil hardness | 7H | 7H | 6H | 7H | Not measurable | 2H | 7H |
| Impact absorption rate | −7.5% | −6.3% | −8.1% | −3.7% | −0.9% | −1.4% | −6.5% |
| Dynamic bending properties | Excellent | Excellent | Excellent | Defective | Defective | Excellent | Defective |
| Elongation at break (%) | 6% | 5% | 5% | 3% | 2% | 3% | 3% |

According to Table 1, it was confirmed that the optical laminates of Examples have a high surface hardness of 6H or more, and do not cause cracks in repeated continuous operation of folding and spreading 100,000 times, and also have a shock absorption rate of −6.3% or less, which thus have high toughness and excellent impact resistance.

On the other hand, it was confirmed that the optical laminates of Comparative Examples 1 to 3 have an impact absorption rate of −3.7% or more and have low toughness and low impact resistance, and that Comparative Examples 1, 2, and 4 cause cracks in a continuous operation of repeatedly folding and spreading 100,000 times. In addition, it was confirmed that in Comparative Examples 2 and 3, the pencil hardness is as low as 2H or less.

What is claimed is:

1. An optical laminate for a flexible display device comprising:
    a support substrate layer; and a hard coating layer positioned on at least one surface of the support substrate layer and having a thickness of 10 μm to 250 μm,
    wherein the hard coating layer comprises a polysiloxane containing 70 mol % or more of a repeating unit including an epoxy group-containing functional group; and an elastomeric polymer including polycaprolactone polyol, and
    wherein the polysiloxane has a number average molecular weight of more than 3,000 Da and less than 10,000 Da, and a polydispersity Index (PDI) of 1.0 or more and less than 5.0.

2. The optical laminate for a flexible display device of claim 1,
    wherein the optical laminate has an impact absorption rate of −4% or less as calculated according the following Equation 1:

Impact absorption rate=$(A_1-A_0/A_0)\times 100$  [Equation 1]

in the Equation 1,
    $A_0$ is an impact force (N) measured by an impact force measurement sensor when a ball weighing 22 g is dropped from a height of 100 mm onto the impact force measurement sensor, and
    $A_1$ is an impact force (N) measured by an impact force measurement sensor when the optical laminate is positioned on the impact force measurement sensor and a ball weighing 22 g is dropped from a height of 100 mm with respect to the hard coat layer of the optical laminate.

3. The optical laminate for a flexible display device of claim 1,
    wherein the hard coating layer contains 5 to 80 parts by weight of the elastomeric polymer based on 100 parts by weight of the polysiloxane containing 70 mol % or more of a repeating unit including the epoxy group-containing functional group.

4. The optical laminate for a flexible display device of claim 1,
    wherein the epoxy group-containing functional group is at least one selected from the group consisting of an alicyclic epoxy group and a functional group represented by the following Chemical Formula 1:

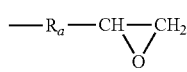

[Chemical Formula 1]

in the Chemical Formula 1,
    $R_a$ is a substituted or unsubstituted alkyl group having 1 to 6 carbon atoms, a substituted or unsubstituted alkenylene group having 2 to 20 carbon atoms, a substituted or unsubstituted alkynylene group having 2 to 20 carbon atoms, —$R_b$—CH=CH—COO—$R_c$—, —$R_d$—OCO—CH=CH—$R_e$—, —$R_f$OR$_g$—, —$R_h$COOR$_i$—, or —$R_j$OCOR$_k$—, and
    $R_b$ to $R_k$ are each independently a single bond; or a substituted or unsubstituted alkylene group having 1 to 6 carbon atoms.

5. The optical laminate for a flexible display device of claim 1,
    wherein the polysiloxane is represented by the following Chemical Formula 2:

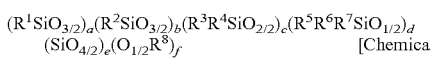

[Chemical Formula 2]

in the Chemical Formula 2,
    $R^1$ to $R^7$ are each independently hydrogen, an epoxy group-containing functional group, an amino group, a mercapto group, an ether group, an ester group, a carbonyl group, a carboxyl group, a (meth)acrylate, a sulfone group, a substituted or unsubstituted alkyl group having 1 to 20 carbon atoms, a substituted or unsubstituted cycloalkyl group having 3 to 20 carbon atoms, a substituted or unsubstituted alkenyl group having 2 to 20 carbon atoms, a substituted or unsubstituted alkynyl group having 2 to 20 carbon atoms, a substituted or unsubstituted alkoxy group having 2 to 20 carbon atoms, a substituted or unsubstituted aryl group having 6 to 20 carbon atoms, a substituted or unsubstituted arylalkyl group having 7 to 20 carbon atoms, or a substituted or unsubstituted alkylaryl group having 7 to 20 carbon atoms, with the proviso that at least one of $R^1$ to $R^7$ is the epoxy group-containing functional group, $R^8$ is a hydrogen atom or an alkyl group having 1 to 20 carbon atoms, and $0<a\leq1$, $0\leq b\leq1$, $0\leq c\leq1$, $0\leq d\leq1$, $0\leq e\leq1$, and $0\leq f\leq1$.

6. The optical laminate for a flexible display device of claim 1,
wherein the polysiloxane has a weight average molecular weight of 3,000 to 250,000 g/mol.

7. The optical laminate for a flexible display device of claim 1,
wherein the epoxy group-containing functional group equivalent weight contained in the polysiloxane is 2.5 to 6.3 mmol/g.

8. The optical laminate for a flexible display device of claim 1,
wherein the polycaprolactone polyol has a number average molecular weight (Mn) of 300 to 10,000 Da.

9. The optical laminate for a flexible display device of claim 1,
wherein the hard coating layer further comprises a reactive monomer including at least one functional group capable of crosslinking with the polysiloxane.

10. The optical laminate for a flexible display device of claim 9,
wherein a weight ratio of the polysiloxane; and the reactive monomer including at least one functional group capable of crosslinking with the polysiloxane is 99:1 to 80:20.

11. The optical laminate for a flexible display device of claim 1,
wherein the optical laminate it has a pencil hardness of at least 5H under load of 750 g on a surface of the hard coating layer.

12. The optical laminate for a flexible display device of claim 1,
wherein cracks do not occur when placing the optical laminate at an interval of 5 mm in the middle of the optical laminate and repeating 100,000 times the process of folding and spreading inward of the hard coating layer at a 90° angle so that the hard coating layer faces to each other at 25° C. at a rate of once per second.

13. A cover window of a flexible display device comprising the optical laminate of claim 1.

14. A flexible display device comprising the optical laminate for a flexible display device of claim 1.

* * * * *